United States Patent [19]

Wallis

[11] Patent Number: 4,939,967

[45] Date of Patent: Jul. 10, 1990

[54] CUT-OFF MACHINE

[76] Inventor: Bernard J. Wallis, 2215 Dacosta, Dearborn, Mich. 48128

[21] Appl. No.: 300,754

[22] Filed: Jan. 23, 1989

Related U.S. Application Data

[63] Continuation of Ser. No. 43,035, Apr. 27, 1987, abandoned.

[51] Int. Cl.⁵ .................... B23D 21/00; B23D 25/04
[52] U.S. Cl. ........................................ 83/150; 83/158; 83/293; 83/298; 83/311; 83/318; 83/326
[58] Field of Search ................ 83/119, 120, 150, 158, 83/286–293, 298, 303, 310, 311, 318–320, 326, 353, 370, 372, 346; 74/600, 837

[56] References Cited

U.S. PATENT DOCUMENTS

| | | | |
|---|---|---|---|
| 2,228,162 | 1/1941 | Benham et al. | 83/318 |
| 2,416,652 | 2/1947 | Stevens et al. | 83/318 |
| 3,280,680 | 10/1966 | Pilliner | 83/326 |
| 3,359,825 | 12/1967 | Wiig | 74/600 |
| 3,457,971 | 7/1969 | Maradyn | 83/86 |
| 3,596,549 | 8/1971 | Miyazaki | 83/318 |
| 3,686,989 | 8/1972 | Dreher | 83/320 |
| 3,797,345 | 3/1974 | Allen | 83/326 |
| 4,462,290 | 7/1984 | Wallis | 83/311 |
| 4,638,904 | 1/1987 | Randar | 74/600 |
| 4,643,063 | 2/1987 | Gobien | 83/311 |

*Primary Examiner*—Hien H. Phan
*Attorney, Agent, or Firm*—Barnes, Kisselle, Raisch, Choate, Whittemore & Hulbert

[57] ABSTRACT

A cut-off machine for cutting off predetermined lengths from a moving length of roll form material such as tubing adapted to be positioned downstream from a source such as a tube mill for receiving a moving length from the mill and severing plural predetermined lengths from the moving length. The machine comprises a plurality of cut-off assemblies which are reciprocated longitudinally of the moving length of material formed by the mill and operated during the movement to sever plural predetermined lengths. The reciprocating and cutting movements are mechanically derived from a motor driven in synchronism with the speed of movement of the moving length. The apparatus includes mechanisms that permit the length of the tubes to be changed while the machine is operating.

32 Claims, 10 Drawing Sheets

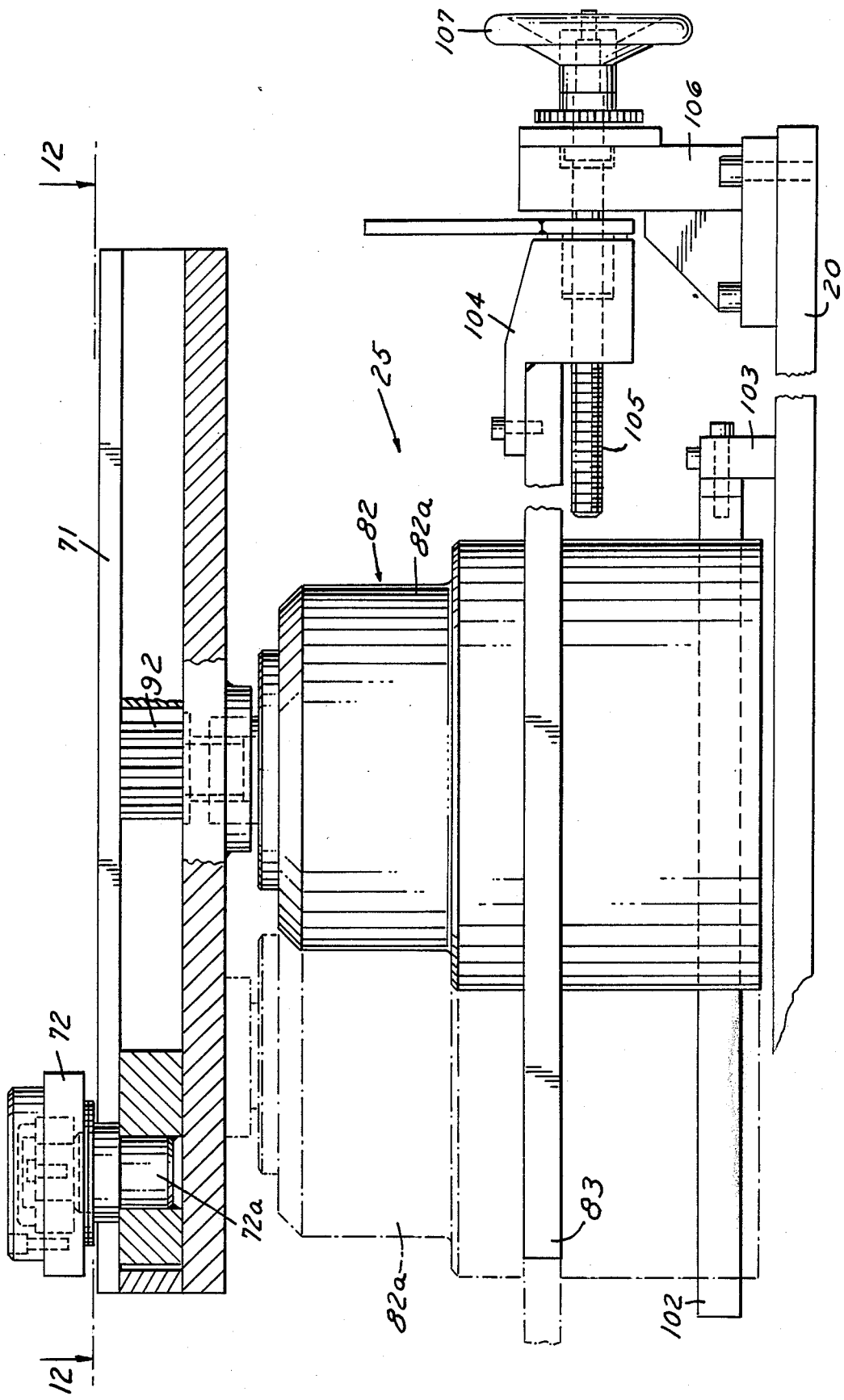

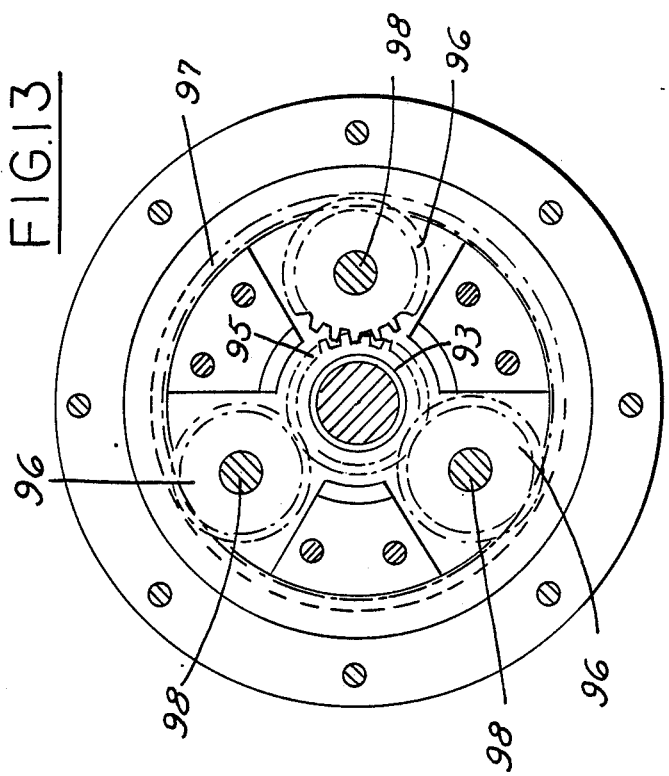
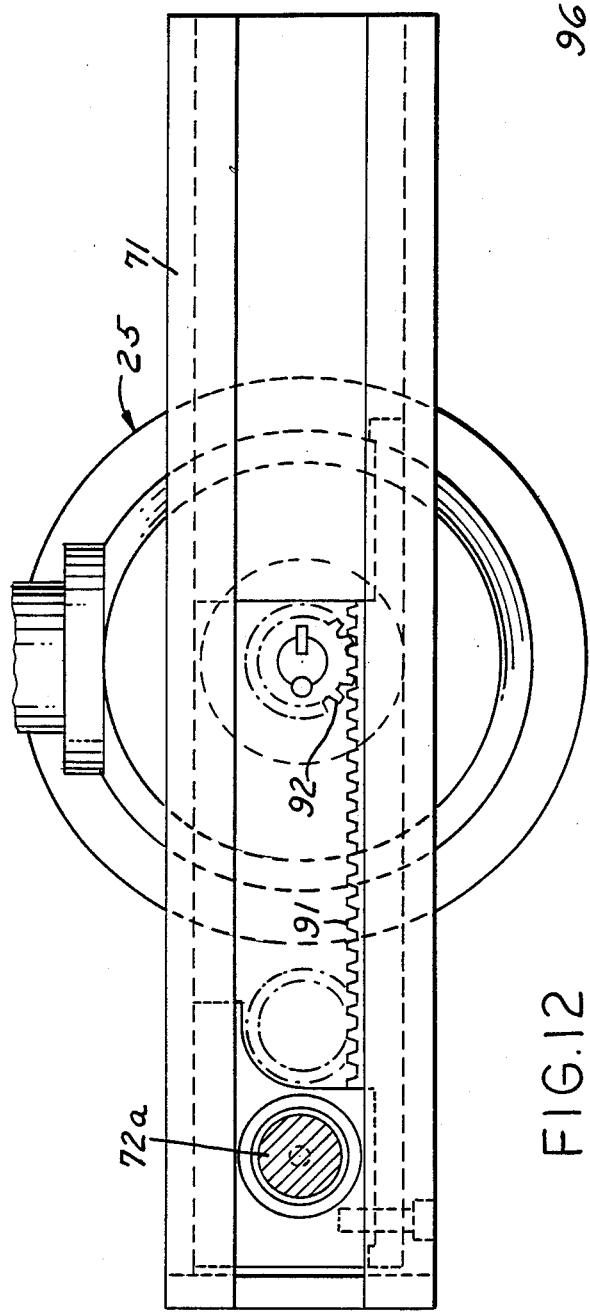
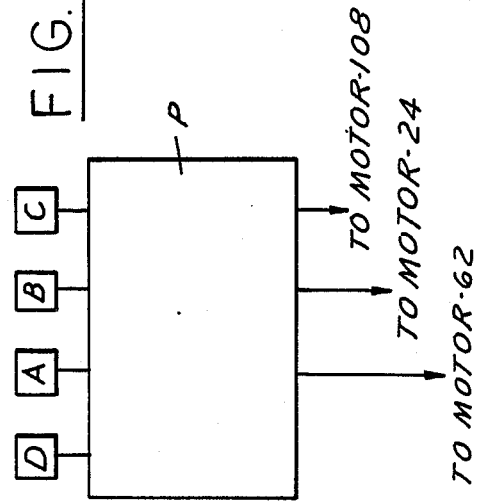

CUT-OFF MACHINE

This application is a continuation of application Ser. No. 043,035, filed Apr. 27, 1987, now abandoned.

This invention relates to roll form cut-off machines for cutting off predetermined lengths from a moving length of roll form material such as tubing and particularly to machines of the type wherein the cut-off operation is performed while the moving length is moving in a path at a high rate of speed.

BACKGROUND AND SUMMARY OF THE INVENTION

In the manufacture of many products, heat exchangers for example, there is a need for large quantities of lengths of material such as tubes are cut to a very precise length with their ends accurately perpendicular to the axis of the tube. Machines for cutting such tubes to length have been provided heretofore. From the standpoint of economy it is a practical necessity that such machines are capable of cutting tubes while the tubing is moving in a rectilinear path at a relatively high velocity, preferably as the tubing is exiting from the last form roll of a tube mill. Thus, such machines invariably employ a slide of some type on which the cut-off device is mounted and a means for moving the slide at the same speed as the tube during the severing operation. Heretofore complicated and costly devices have been employed for synchronizing the speed of the tube drive means and the speed of the slide on which the cut-off device is mounted. These means have been primarily electrically or air operated. Such synchronizing devices have been not only expensive, but also incapable of functioning accurately when the tube speed is in excess of about 175 feed per minute.

In my prior U.S. Pat. No. 4,462,290, a tube cut-off unit is arranged at the downstream end of a tube mill and is powered by a drive unit mechanically driven by the main shaft of the mill which drives the tube forming rolls. The drive unit mechanically rotates a crank which, through a link, reciprocates a slide along the path of travel of the tube. A tube cut-off blade on the slide is cam actuated to sever the tube. Means are provided to insure that the slide is moving at a constant speed and at the same speed as the tube when the tube is being severed.

Among the objectives of the present invention are to provide a cut-off machine for severing a plurality of lengths such as tubes from a moving length; which severing operation is conducted while the tubing is moving from a mill; which utilizes a novel cut-off assembly; which has minimum wear; and which can be adjusted for varying lengths of tube while the machine is operating.

In accordance with the invention, the cut-off machine comprises a cut-off machine for cutting off predetermined lengths from a moving length of roll form material such as tubing adapted to be positioned downstream from a source such as a tube mill for receiving a moving length from the mill and severing plural predetermined lengths from the moving length. The machine comprises a plurality of cut-off assemblies which are reciprocated longitudinally of the moving length of material formed by the mill and operated during the movement to sever plural predetermined lengths. The reciprocating and cutting movements are mechanically derived from a motor driven in synchronism with the speed of movement of the moving length. The apparatus includes mechanisms that permit the length of the tubes to be changed while the machine is operating.

DESCRIPTION OF THE DRAWINGS

FIG. 11 is a fragmentary elevational view on an enlarged scale taken along the line 11—11 in FIG. 1, parts being broken away and parts being shown in a different operative position.

FIG. 12 is a view taken along the line 12—12 in FIG. 11, parts being broken away.

FIG. 13 is a fragmentary part sectional view taken substantially along the 13—13 in FIG. 10.

FIG. 16 schematic control system for the machine.

DESCRIPTION

Figure 1:
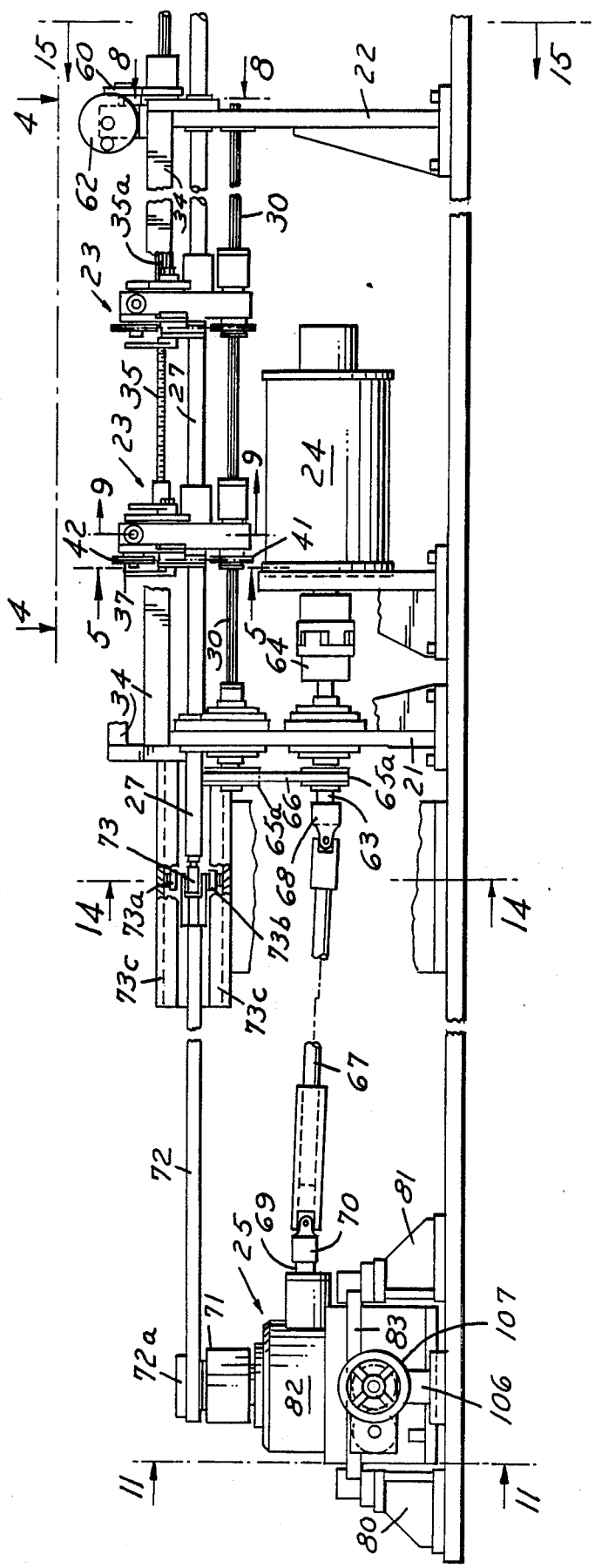
FIG. 1 a fragmentary side elevational view of a tube cut-off machine embodying the invention.
Figure 2:
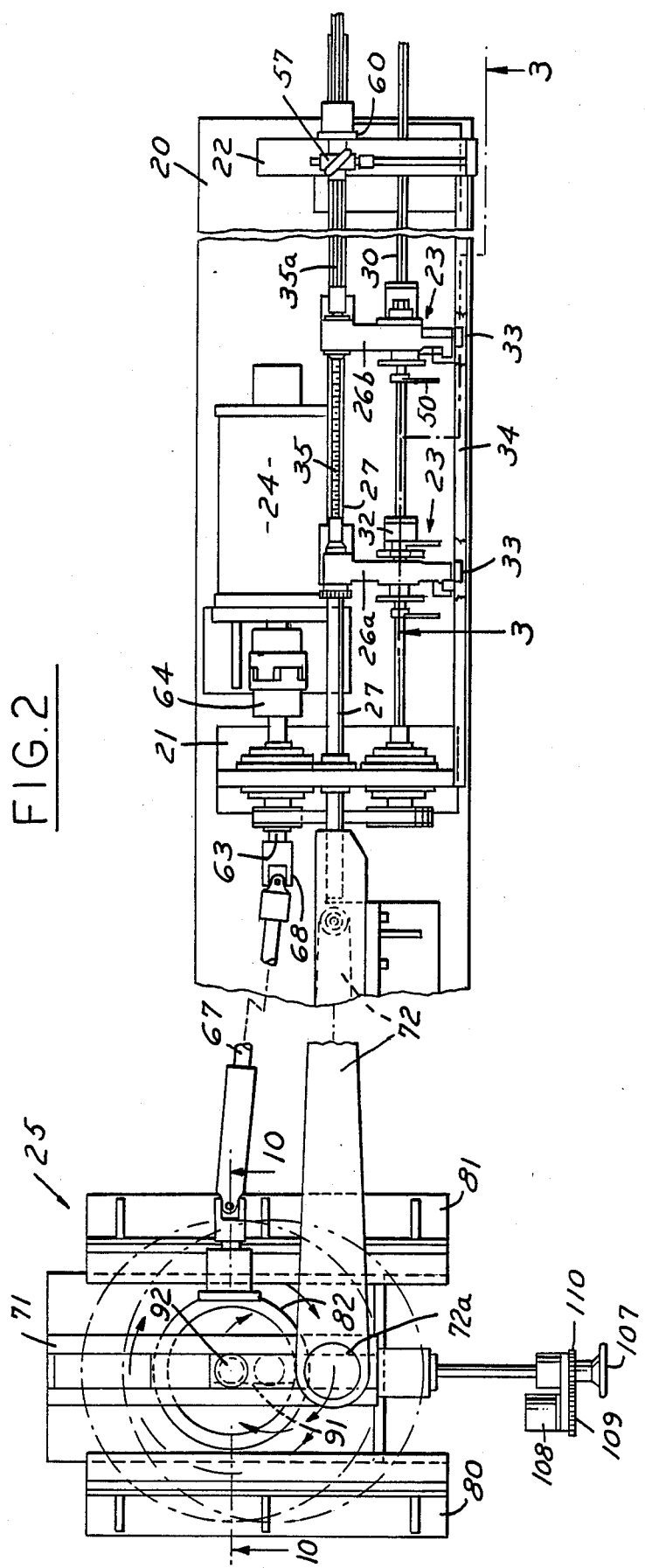
FIG. 2 is a fragmentary plan view of the tube cut-off machine.

Referring to FIGS. 1 and 2, the cut-off machine embodying the invention is adapted to receive a continuous moving length of material such as roll form material like tubing from a source such as a tube mill and simultaneously cut off a plurality of lengths from the moving length as the tubing is moving away from the tube mill. The machine comprises a base 20 and uprights 21, 22 on the base 20 which support a plurality of tube cut-off assemblies 23, herein shown as two, which are reciprocated longitudinally and are moved simultaneously in synchronism with the tube. Each cut-off assembly 23 include a knife blade that is rotated to cut off a length of tube from the tubing, as presently described. The drive is derived from a servo motor 24 which drives a gear and crank assembly 25 mounted on base 20 which, in turn, reciprocates the cut-off assemblies 23 and rotates the cutting knives of the cut-off assemblies 23, as presently described.

Referring to FIGS. 3–9, each tube cut-off assembly 23 includes a body 26a, 26b fixed on a shaft 27 which is mounted on the uprights 21, 22 for longitudinal reciprocation by linear bushings 28. One body 26a is in the form of a casting that is clamped to the shaft 27 by a bolt 29. Each body 26a, 26b is supported for longitudinal reciprocating movement relative to a spline shaft 30 extending longitudinally between the uprights 21, 22. A roller 33 is rotatably mounted on each body 26a, 26b about a horizontal axis and rests on a fixed rail 34 extending longitudinally between the uprights 21, 22. Ball bearings 31 rotatably support a spline bushing 32 on each body 26a, 26b. Spline shaft 30 extends through bushings 32a such that the shaft 30 can rotate as well as support each body 26a, 26b for relative longitudinal movement in conjunction with roller 33 resting on fixed longitudinal rail 34. The other body 26b is maintained at a predetermined distance with respect to body 26a, corresponding to the length of the tubing to be cut by the respective knives by a threaded shaft 35 rotatably mounted in body 26a and threaded into a nut 36 in body 26b, as presently described.

Figure 3:
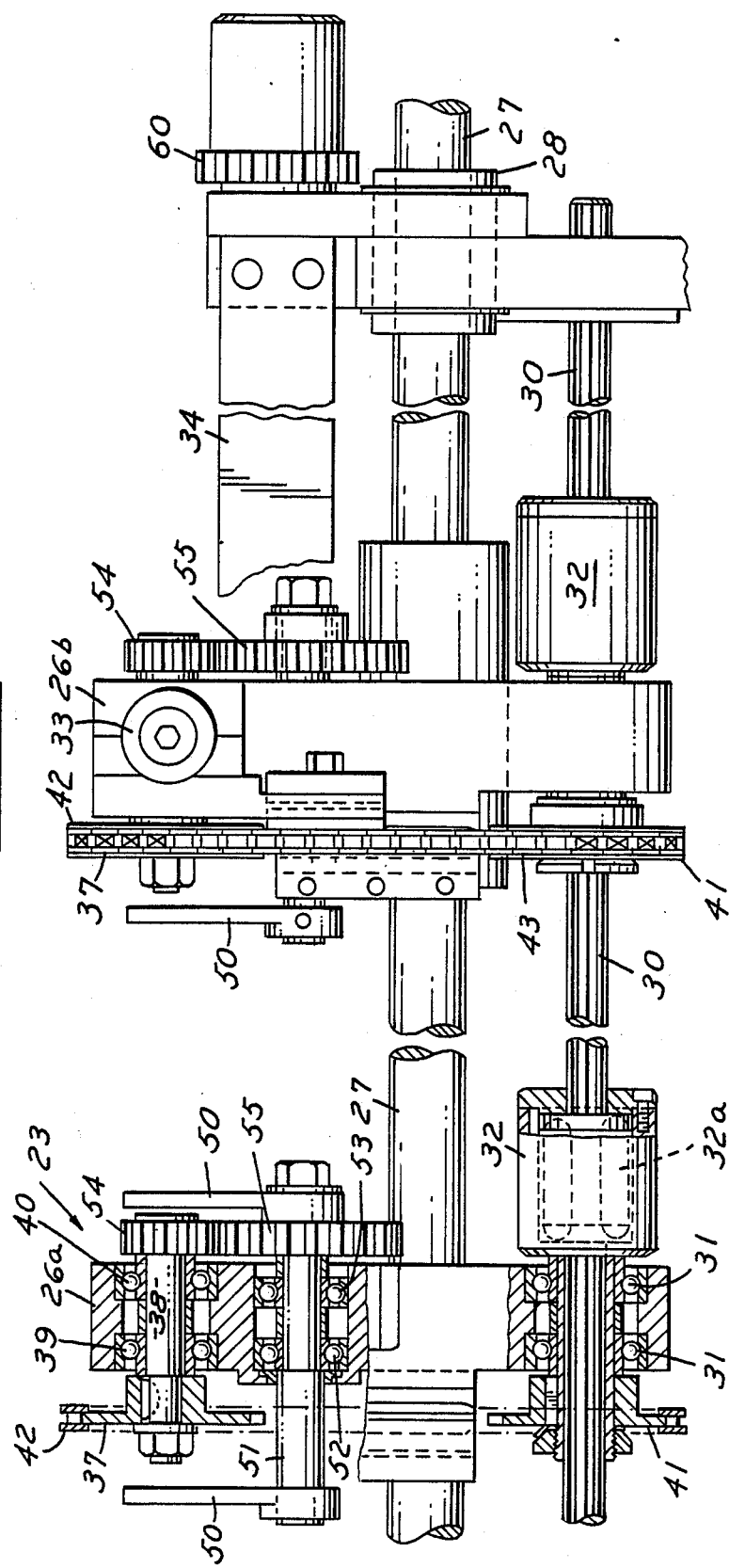
FIG. 3 is a fragmentary part sectional view on an enlarged scale of a portion of the machine shown in FIG. 1 taken along the line 3—3 in FIG. 2 showing parts in a different operative position.

As shown in FIG. 3, each body 26a, 26b of each tube cut-off assembly includes an upper sprocket 37 fixed on a shaft 38 and rotatably mounted by bearings 39, 40 in the body and a lower sprocket 41 fixed on a tubular shaft bearing 32. A spline shaft 30 has a spline connection with the interior of the tubular shaft of bearing 32. An endless roller chain 42 is trained over the sprockets 37,41 and includes a knife blade support 43 clamped to the roller chain 42 on which a knife blade 44 is mounted. The knife blade 44 includes a cutting edge that functions to move transversely of the tube T as it is guided in a guide slot 45 on a bracket 46 on each body 26a, 26b. Slot 45 opens downwardly.

Each body 26a, 26b further supports at least one ejector bar 50 which is fixed on a short shaft 51 rotatably mounted by bearings 52, 53 in the body 26a, 26b. The bars 50 are rotated in a direction counter to the direction of the knife blade 44 by a pinion 54 on shaft 38 that meshes with a larger gear 55 on the shaft 51. Two ejector bars 50 are provided on the tube cutting assembly which is furthest downstream, which acts on the leading portion and tracking portion of the tube which is being cut off, respectively. One ejector bar 50 is mounted on the second tube cut-off assembly nearest the mill and acts on the tracking portion of the second tube being cut.

Figure 4:
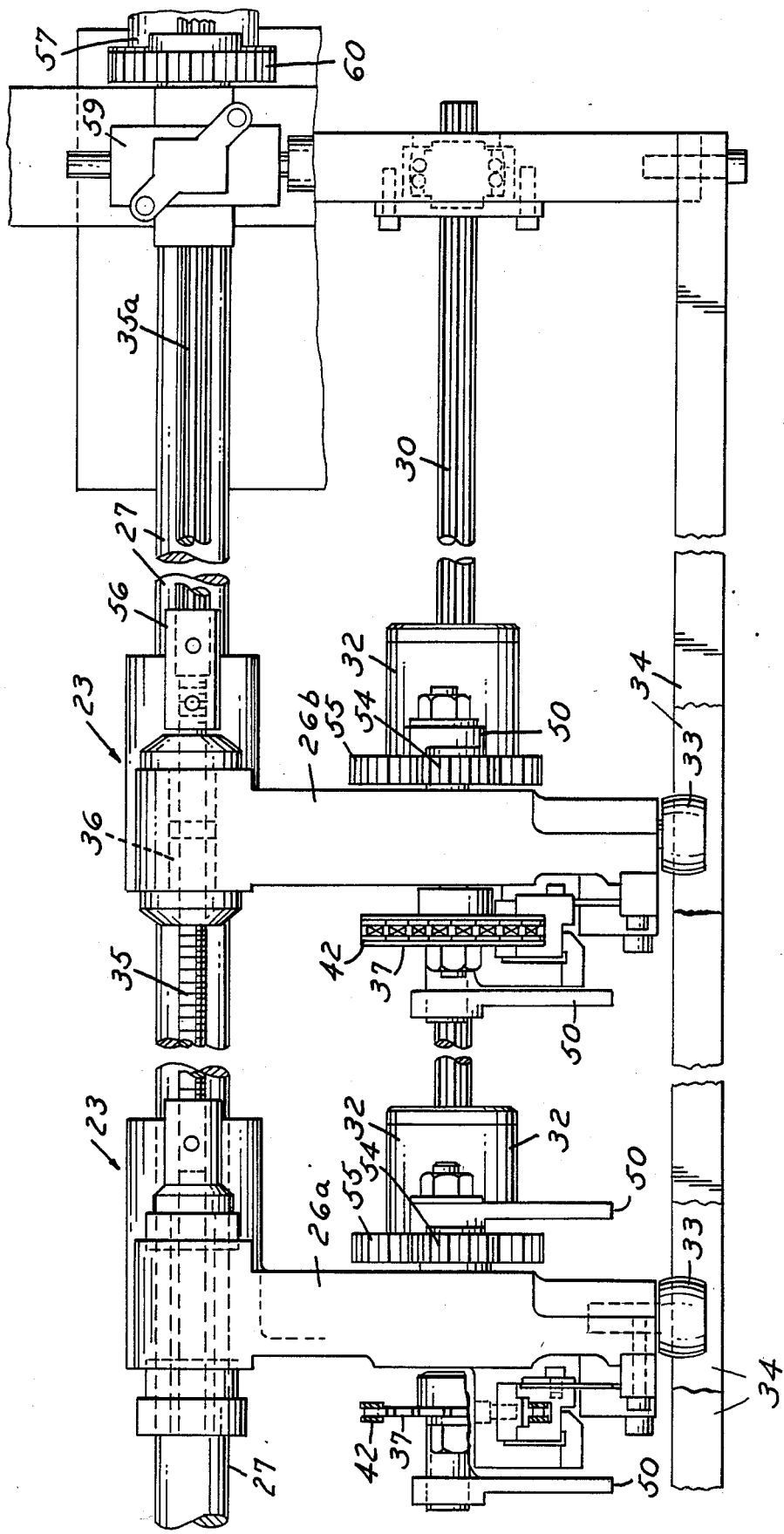
FIG. 4 is a fragmentary plan view on an enlarged scale taken along the line 4—4 in FIG. 1
Figure 6:
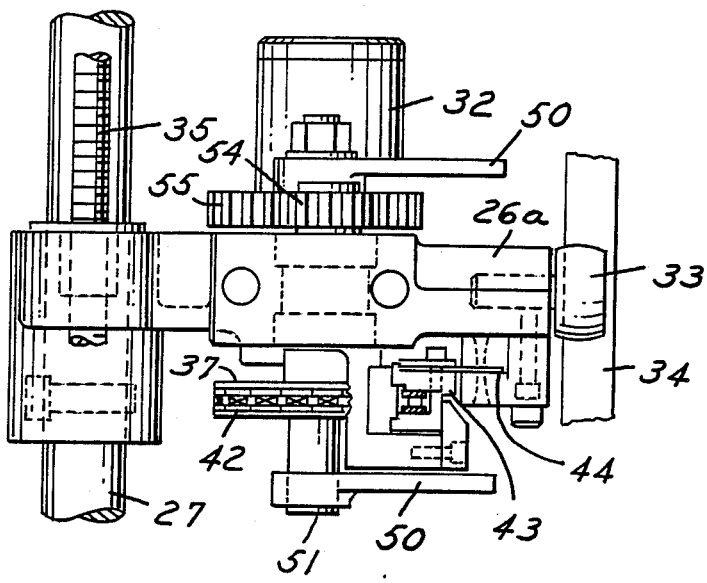
FIG. 6 is a plan view of the portion of the machine shown in FIG. 5.
Figure 5:
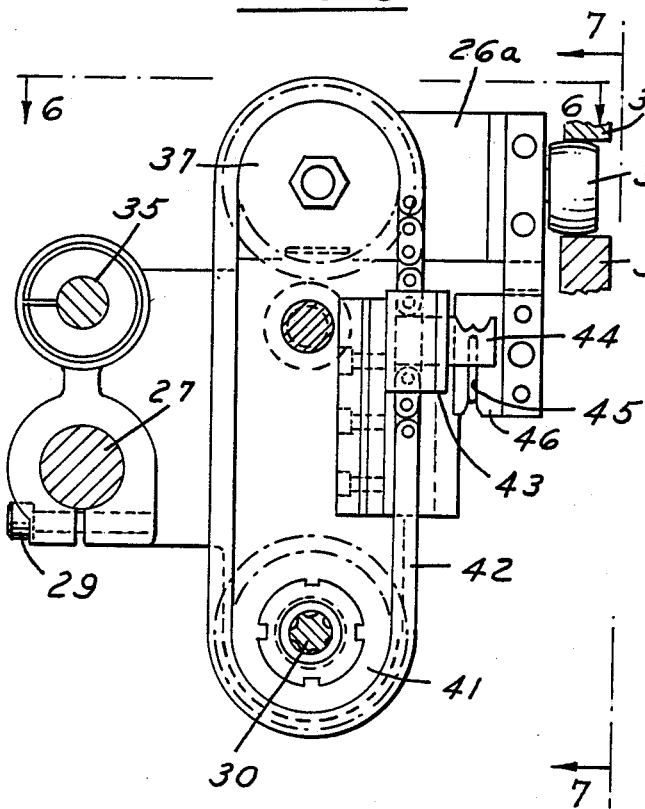
FIG. 5 is a fragmentary elevational view on an enlarged scale taken along the line 5—5 in FIG. 1.
Figure 7:
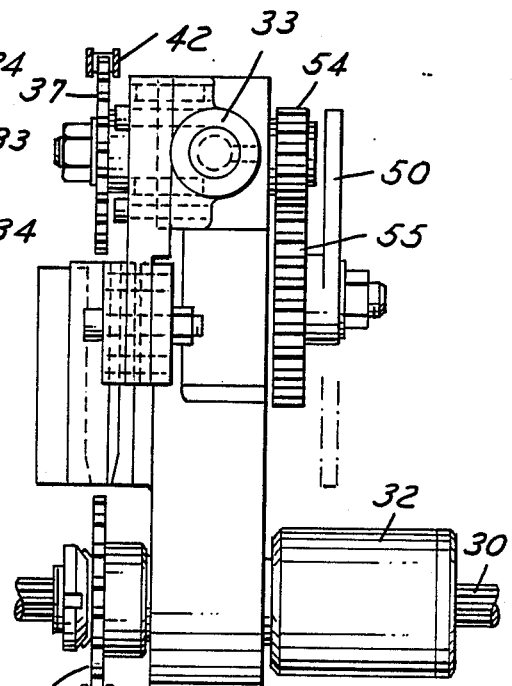
FIG. 7 is a side view taken from the right in FIG. 5.
Figure 8:
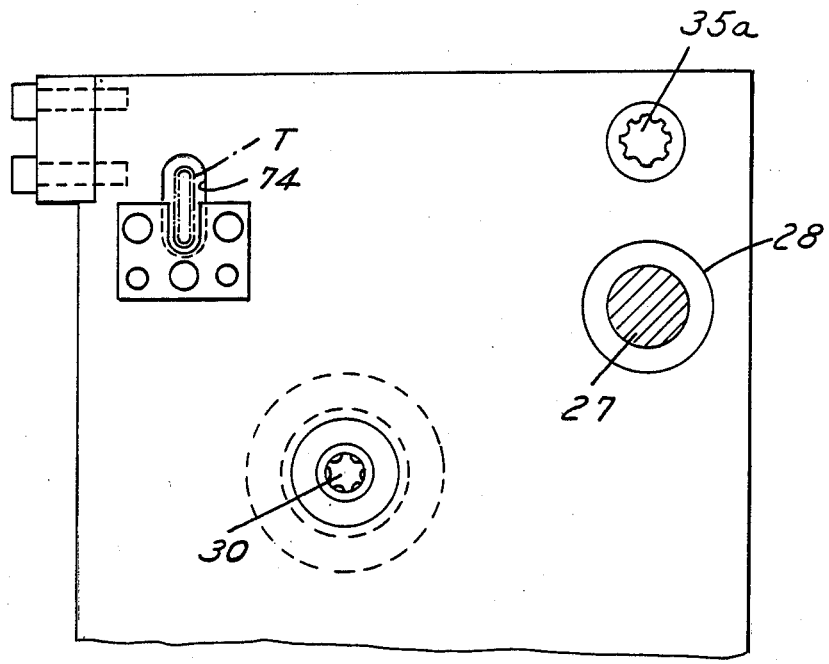
FIG. 8 is a fragmentary view on an enlarged scale taken along the line 8—8 in FIG. 1.
Figure 9:
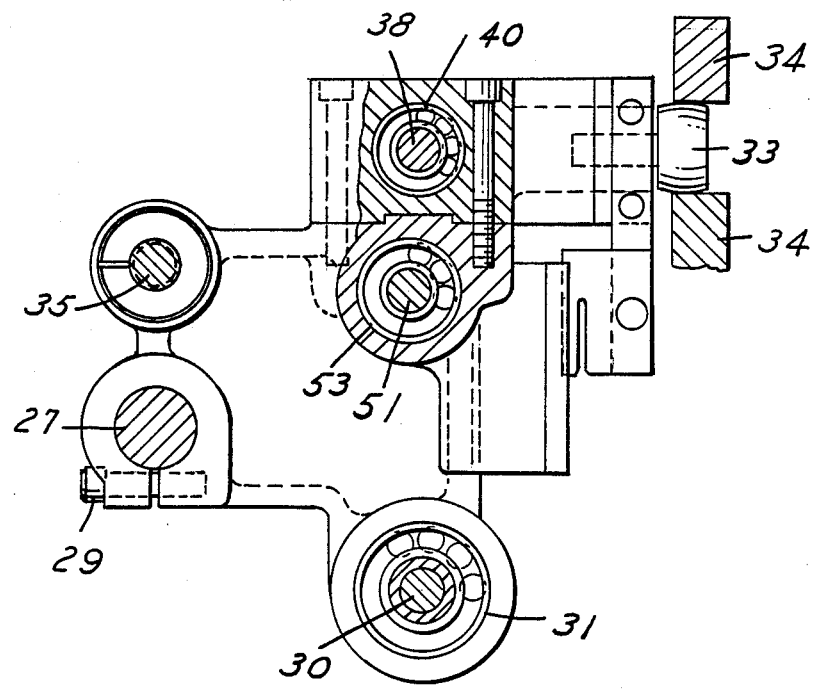
FIG. 9 is a part sectional view on an enlarged scale taken along the line 9—9 in FIG. 1.
Figure 10:
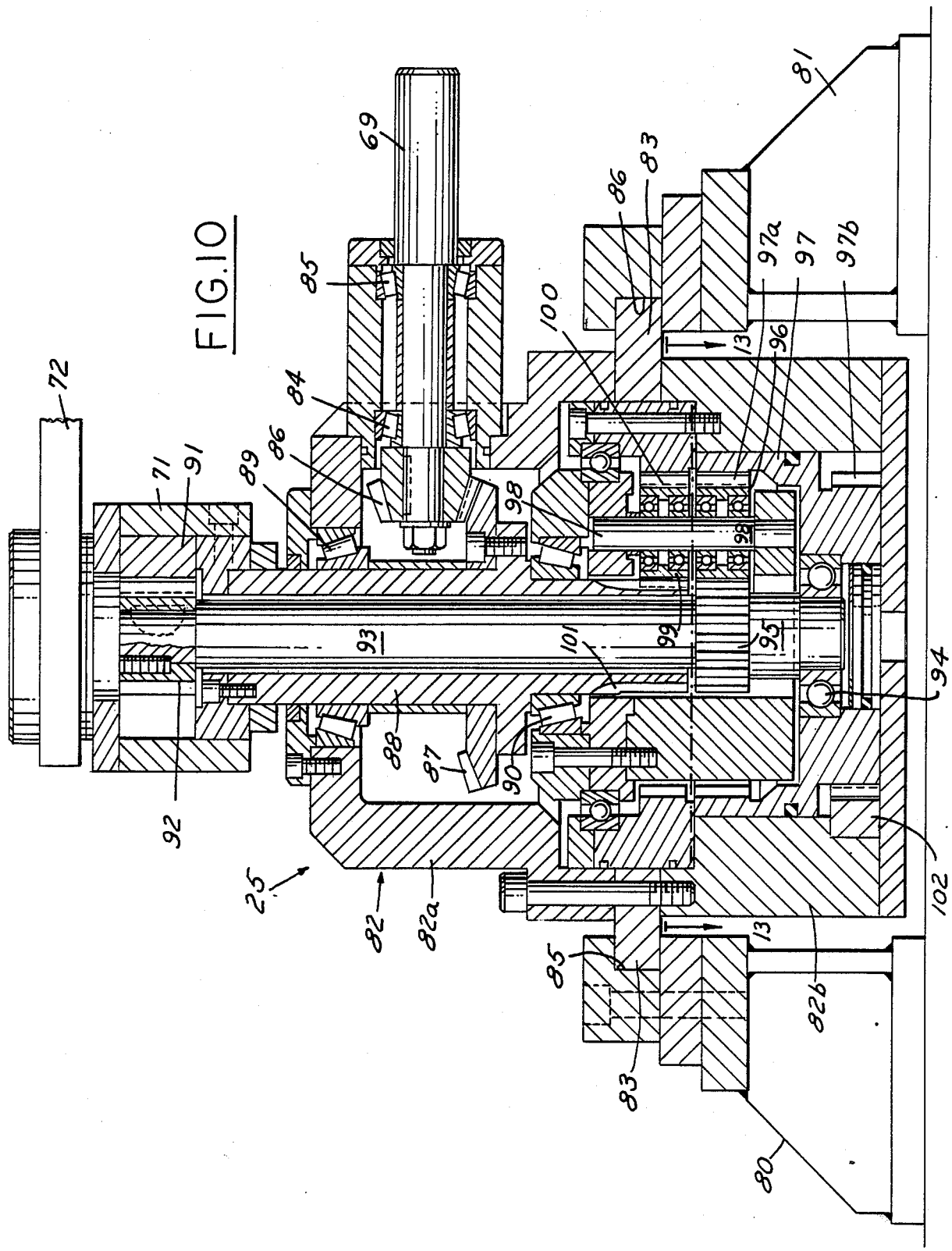
FIG. 10 is a fragmentary sectional view on an enlarged scale taken along the line 10—10 in FIG. 2.
Figure 15:
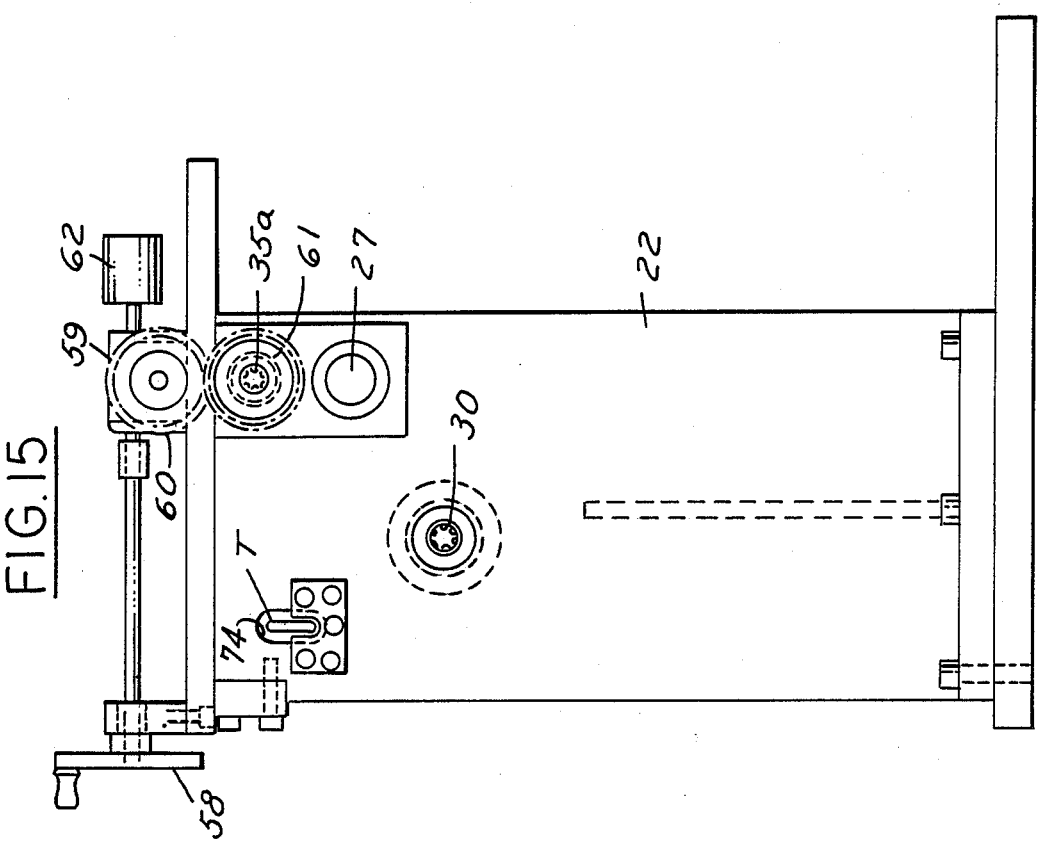
FIG. 15 is an end view on an enlarged scale taken along the line 15—15 FIG. 1.

Referring to FIGS. 4 and 5, the position of one tube cut-off assembly relative to the other can be adjusted by threaded shaft 35. This is achieved by an extension 35a in the form of spline shaft connected to the end of threaded shaft 35 by a coupling 56 and extending through a ball spline bearing 57 on upright 22. As shown in FIG. 15, a hand crank 58 drives a right angle box having a gear 59 that meshes with a gear 60 which, in turn, meshes with a gear 61 on shaft 35a to translate body 26b along shaft 35 and thereby adjust the distance between knives 44. In addition, a servo motor 62 is provided to form a power drive for gear 60.

Referring to FIG. 1, servo motor 24 drives a shaft 63 journalled in upright 21 through a coupling 64. The shaft 63 is connected by pulleys 65a, 65b and a belt 66 to drive the spline shaft 30 and thereby provide the drive to the knives 44 and ejector bars 50 of the tube cut-off assemblies 23. Shaft 63 further drives a connecting shaft 67 through a universal coupling 68 and, in turn, drives an input shaft 69 of the gear and crank assembly 25 through a universal coupling 70.

The gear and crank assembly 25 includes a crank 71 and a crank arm 72 that extends to a pivot coupling 73 on the shaft 27 for reciprocating the tube cut-off assemblies 23. The crank arm 72 is pivoted to the crank 71 by a pivot coupling pin 73. Pivot coupling 73 is supported for linear movement by rollers 73a, 73b that ride in U-shaped tracks 73c, 73d. The crank assembly 25 functions to drive the crank arm 71 for reciprocating the shaft 27 and, in turn, the tube cut-off assemblies 23 as well as making it possible to change the length of the crank arm in order to provide tubing of different lengths as may be desired.

Figure 14:
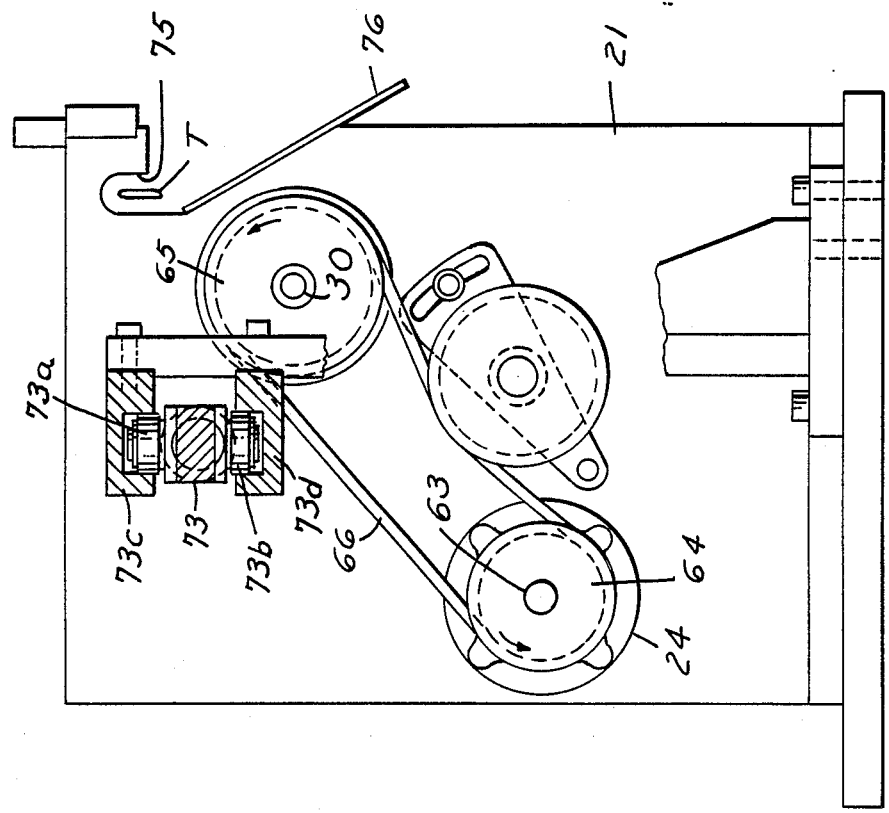
FIG. 14 is a part sectional view on an enlarged scale taken along the line 14—14 in FIG. 1.

Referring to FIG. 15, the upright 22 includes a vertically extending guide slot 74 for guiding the tubing T from the mill. As shown in FIG. 14, upright 21 supports a downwardly open guide slot 75 for the leading end of tube length L and a deflector 76 that extends at an angle to a longitudinal vertical plane to guide the leading tube length L laterally to the side of the machine.

Referring to FIGS. 1, 2, 10 and 11, the gear and crank assembly 25 comprises longitudinally spaced sub-bases 80, 81 which support a housing 82 for transverse movement. Housing 82 comprises an upper portions 82a and a lower portion 82b. A flange 83 on housing 82 engages grooves 85,86 in sub-bases 80, 81.

The input shaft 69 is rotatably mounted in a housing 82 by bearings 84, 85 and drives a bevel gear 86 which, in turn, drives a complementary bevel ring gear 87. The ring gear 87 is fixed on a vertical tubular shaft 88 that is rotatably supported between an upper bearing 89 and a lower bearing 90. The crank 71 is mounted on shaft 88 such that upon rotation of input shaft 69, the tubular shaft 88 is rotated to swing the crank arm 72 in a circle and thereby reciprocate the shaft 27 and, in turn, the tube cut-off assemblies 23 longitudinally back and forth in synchronism with the speed of the tubing T. The continuously rotating knives are driven such that cut-off of the tube lengths occurs when crank arm 37 is aligned with the shaft 27, that is when the crank 71 is perpendicular to the crank arm 72. At that point the longitudinal speed of the shaft 27 and the tube cut-off assemblies mounted thereon is the same as the speed of the tubing T. The angle which the crank 71 forms with crank arm 72 must be within 15° of the perpendicular or right angle relationship between the crank 71 and crank arm 72.

Provision is made for changing the effective length of the crank 71 during operation of the machine and comprises a differential mechanism for changing the length of the crank arm 71 when maintaining the axis of the pivot 72a in alignment with the crank arm 72 and shaft at the time of operation of the knives of tube cut-off assemblies 23. The differential gear mechanism functions when the housing 82 is moved transversely and thereby move the shaft 88 which rotates the crank 71 relative to the pivot shaft 72a of the crank 71. The differential mechanism comprises a gear rack 91 and a pinion 92 mounted on a vertical shaft 93 within tubular shaft 88. Shaft 93 has its lower end journalled for rotation in bearing 94 in lower portion 82b of housing 82. Shaft 93 has a gear 95 fixed thereon which is part of a first planetary gear system. Gear 95 meshes with the planetary gears 96 which, in turn, meshes with an internal gear 97 (FIG. 13) which is rotatable in housing portion 82b. Planetary gears 96 have common shafts 98 with a second set of planetary gears 99 of a second planetary gear system. Gears 99 mesh with a second internal gear 100 fixed on housing 82 and with a gear 101 formed on the lower end of tubular shaft 88. A gear rack 102 meshes with the external gear 97b on member 97 which is rotatable in lower housing portion 82b. As shown in FIG. 11, a rack 102 extends externally of housing 82 and is connected to a bracket 103 fixed on base 20.

The flange 83 is connected to a bracket 104 that is threaded onto a horizontal shaft 105 which is journalled on a short upright 106 on base 20 and can be rotated by a handwheel 107 or motor 108. Rotation of the handwheel 107 or energization of a servo motor 108 and gears 109, 110 (FIG. 2) will move the housing 82 lengthwise of the slots 85, 86 and therefore transversely of the length of the machine. This movement causes housing 82 to be translated transversely of the cut-off machine. Inasmuch as rack 102 is fixed, movement of the housing causes rack 102 to rotate external gear 97b and internal gear 97a and thereby rotate the first planetary system relative to the second planetary system to rotate the inner shaft 93 and pinion 92. Rotation of pinion 92 translates the rack 91 to change the relative position of the shaft 93 and crank pivot 72a and change the effective length of crank 71.

It can be seen that rotation of shaft 93 through the differential mechanism translates the housing 82 toward and away from the pivot 72a of crank 71 without changing the alignment of the axis of pivot 72a, crank arm 71 and shaft 27 when the crank 71 is perpendicular to the crank arm 72 and shaft 27. Inasmuch as this condition is maintained, the adjustment can be made while the apparatus and the tube mill are operating.

The travel of pivot 72a in one circular path corresponds to the total length of tube to be cut off and moves the cut-off assemblies at substantially the same linear speed as the tubing at the moment of cut off.

The ability to change the length of the arm without stopping the apparatus and the tube mill is especially important when the tube mill is making tubing by brazing or soldering, as in the case of brass. In such processes, interruption of the operation of the mill causes substantial additional start up time for the mill.

In operation, tubing from a mill is continuously directed through the tube cut-off machine. The speed of the tubing is monitored and the motor 24 is operated to drive the cut-off assemblies 23 in synchronism with the tubing speed from the mill so that the desired lengths of tubing are cut off. By lengthening or shortening the crank arm 71, the distance that the tube cut-off assemblies 23 is moved is changed.

Referring to FIG. 16, which is a schematic of a control system for the apparatus, a sensor A continuously monitors the speed of the motor 24, a sensor B continuously senses the position of housing 82 and, thus, the length of crank 72 and a sensor C senses the relative position of the tube-cutting assemblies 23. These sensors provide signals to a microprocessor P which functions to maintain the proper speed of rotation of motor 24 in synchronism with the speed of the tubing. Thus, the speed of rotation of crank 71 which reciprocates the shaft 27 with the tube-cutting assemblies 23 thereon and the speed of operation of the knives of the assemblies 23 are maintained in synchronism.

If the length of the tubes is to be changed, the operator changes a controller D to input an appropriate signal to the microprocessor to operate the motor 62 and vary the distance between assemblies 23; the speed of motor 24; and make the appropriate change in operator motor 108 until the appropriate change is made in the length of arm 71.

The utilization of knives 44 that move only in one direction through the tubing greatly increases the cutting cycle as contrasted to knives that need to be returned across the path of the tubing. Cut off is achieved in each revolution of crank 71. The length of tube to be cut off can be readily adjusted by adjusting the relative position of the cut-off assemblies 23 while the machine is operating. In addition, the adjustment of the crank length to accommodate for the same speed of tubing can also be adjusted during machine operation.

I claim:

1. A cut-off machine adapted to be positioned downstream from a source for receiving moving lengths of tubing such as tubing from the mill and severing a length from the moving length,
   said machine comprising a cut-off assembly which is reciprocated longitudinally of the moving length formed by the mill and operated during the movement toward the mill to sever a predetermined length,
   means for supporting said cut-off assembly for reciprocating movement,
   means for reciprocating said cut-off assembly in synchronism with the speed of moving lengths delivered by the mill to the machine,
   said cut-off assembly including a non-rotating knife blade having a cutting edge for movement in an endless path, a portion of said endless path being in a direction transversely to the axis of movement of the moving length of tubing,
   means for moving the knife blade for cutting off a length from said moving length of tubing,
   supporting means for supporting said tubing adjacent the cut-off assembly, and
   means for controlling said endless path such that the knife blade moves in a straight line adjacent each tube supporting means such that said cutting edge of said knife blade moves in a straight line transversely of its cutting edge with respect to said tubing at said support means to cut a length from said moving length of tubing in a single stroke.

2. The cut-off machine as set forth in claim 1 including a motor, and
   means interconnecting said motor and said means for reciprocating said cut-off assembly.

3. The cut-off machine set forth in claim 2 including means for varying the position of said cut-off assembly during continuous operation of the machine to vary the predetermined length being cut off.

4. The cut-off machine set forth in claim 2 including means interconnecting said motor and said means for moving said knife blade.

5. The cut-off machine set forth in claim 1 wherein said means for reciprocating said cut-off assembly comprises a shaft supporting said cut-off assembly and mounted for reciprocating movement relative to the path of movement of the moving length in the machine.

6. The cut-off machine set forth in claim 5 including means for adjusting the relative position of said cut-off assembly on said shaft to vary the lengths being cut off.

7. The cut-off machine set forth in claim 6 wherein said means for adjusting the relative position of the cut-off assembly is constructed and arranged such that the relative position can be adjusted while the machine is continuously operating.

8. The cut-off machine set forth in claim 1 wherein said means for reciprocating said cut-off assembly comprises a rotating crank having an adjustable length and means for adjusting the length of the crank while the machine is continuously operating to vary the length of the crank and therefore the distance of reciprocation of the cut-off assembly.

9. The cut-off machine set forth in claim 8 wherein said means for adjusting the length of said crank comprises first drive means for rotating said crank and second drive means for changing the effective length of said crank, said first and second means being adjustable relative to one another.

10. The cut-off machine set forth in claim 9 including means for changing the relative positions of said first drive means and second drive means.

11. The cut-off machine set forth in claim 10 wherein said means for changing the relative positions of said first drive means and second drive means comprises differential gear means.

12. The cut-off machine set forth in claim 1 including an ejection bar associated with the knife of said cut-off assembly for ejecting the length which is cut off.

13. A cut-off machine adapted to be positioned downstream from a source mill for receiving a moving length of a tubular workpiece from the mill and severing plural lengths from the moving workpiece
 said machine comprising a plurality of cut-off assemblies space longitudinally from one another at a predetermined distance which are reciprocated longitudinally of the workpiece formed by the mill and operated during the movement toward the machine to sever plural predetermined lengths,
 means for supporting said cut-off assemblies for reciprocating movement,
 means for reciprocating said cut-off assemblies in synchronism with the speed of moving length delivered to the machine,
 each said cut-off assembly including a non-rotating knife blade having a cutting edge for movement in an endless path, a portion of said endless path being in a direction transversely to the axis of movement of the moving length,
 means for moving the knife blade in synchronism for simultaneously cutting off a plurality of tube lengths from said moving length,
 supporting means for supporting said tubing adjacent the cut-off assembly, and
 means for controlling said endless path such that the knife blade is moved in a straight line adjacent said supporting means such that said cutting edge of said knife blade moves in a straight line transversely of its cutting edge with respect to said tubing at said support means to cut a length from said moving length of tubing in a single stroke.

14. The cut-off machine set forth in claim 13 including a motor, and
 means interconnecting said motor and said means for reciprocating said cut-off assemblies.

15. The cut-off machine set forth in claim 14 including means for varying the distance between the cut-off assemblies during operation of the machine to vary the lengths being cut off.

16. The cut-off machine set forth in claim 14 including means interconnecting said motor and said means for moving said knife blades.

17. The cut-off machine set forth in claim 16 wherein said means for reciprocating said tube cut-off assemblies comprises a shaft supporting said cut-off assemblies and mounted for reciprocating movement relative to the path of movement of the moving length toward the machine.

18. The cut-off machine set forth in claim 17 including means for adjusting the relative positions of said cut-off assemblies on said shaft to vary the lengths being cut.

19. The cut-off machine set forth in claim 18 wherein said means for adjusting the relative positions of the cut-off assemblies is constructed and arranged such that the relative positions can be adjusted while the machine is continuously operating.

20. The cut-off machine set forth in claim 13 wherein said means for reciprocating said cut-off assemblies comprises a rotating crank which is adjustable in length and means for adjusting the length of the crank constructed and arranged while the machine is operating to vary the length of the crank and therefore the distance of reciprocating of the cut-off assemblies.

21. The cut-off machine set forth in claim 20 wherein said means for adjusting the length of said crank comprises first drive means for rotating said crank and second drive means for changing the effective length of said crank, said first and second means being adjustable relative to one another.

22. The cut-off machine set forth in claim 21 including means for changing the relative positions of said first drive means and second drive means.

23. The cut-off machine set forth in claim 22 wherein said means for changing the relative positions of said first drive means and second drive means comprises differential gear means.

24. The cut-off machine set forth in claim 13 including an ejector bar associated with the knife of the cut-off assembly nearest the mill and a pair of ejector bars associated with the knife of the cut-off assembly furthest from the mill for ejecting the lengths being cut off.

25. The cut-off machine set forth in claim 13 wherein said moving length comprising tubing.

26. A cut-off machine adapted to be positioned downstream from a source mill for receiving a moving length of material from the mill and severing a length from the moving length,
 said machine comprising a cut-off assembly which is reciprocate longitudinally of the moving length and operated during the movement toward the machine to sever a length,
 means for supporting said cut-off assembly for reciprocating movement,
 means for reciprocating said cut-off assembly in synchronism with the speed of moving length,
 a motor,
 means interconnecting said motor and said means for reciprocatinq said tube cut-off assembly,
 means interconnecting said motor and said means for moving said knife blade,
 said means for reciprocating said cut-off assembly comprising a shaft supporting said cut-off assembly and mounted for reciprocating movement relative to the path of movement of the moving length,
 said means for reciprocating said cut-off assembly comprising a rotating elongated crank having an adjustable length and a pivot point,
 means for adjusting the length of the crank while the machine is operating to vary the length of the crank and therefore the distance of reciprocating of the cut-off assembly,
 said means for adjusting the length of said crank comprising first drive means for rotating said crank and second drive means for changing the effective length of said crank,
 means for changing the relative positions of said first and second drive means,
 said means for interconnecting said motor and said cut-off assembly comprising a crank arm pivotally connecting said crank and said shaft supporting said cut-off assembly, a housing supported for transverse movement relative to the direction of movement of said moving length, said pivot point of said crank to said crank arm being substantially aligned with the axis of the shaft on which said cut-off assembly is mounted when the crank is substantially perpendicular to said shaft, and differential means in said housing between said motor and said crank for changing the effective length of said crank while the motor is operating by moving said housing transversely relative to the direction of movement of said length of material in said machine, while maintaining said pivot point if alignment with the axis of said shaft.

27. The cut-off machine set forth in claim 26 including means for sensing the position of the cut-off assembly, means for sensing the speed of the tubing,
means for sensing the speed of the motor,
means for sensing the position of the housing,
microprocessor means responsive to each of said sensing means and operable to maintain the speed of the motor in synchronism with the speed of the tubing, maintain the length of the crank for reciprocating a predetermined distance and synchronizing the operation of the knife of the cut-off assembly.

28. The cut-off machine set forth in claim 26 wherein said cut-off assembly includes means for guiding said knife blade in an endless path, supporting means for supporting said tubing adjacent the cut-off assembly,
said endless path having a portion adjacent said supporting means which moves in a straight line such that said knife blade moves in a straight line transversely with respect to said tubing at said support means to cut a length from said moving length of tubing.

29. A cut-off machine adapted to be positioned downstream from a source mill for receiving a moving length of material from the mill and severing plural lengths from the moving length, said machine comprising cut-off assemblies which are reciprocated longitudinally of the moving length and operated during the movement to sever a length of material,
means for supporting said cut-off assemblies for reciprocating movement,
means for reciprocating said cut-off assemblies in synchronism with the speed of moving lengths delivered by the mill to the machine,
means interconnecting said motor and said means for reciprocating said cut-off assemblies,
means interconnecting said motor and said means for moving said knife blade,
said means for reciprocating said cut-off assemblies comprising a shaft supporting said cut-off assemblies and mounted for reciprocating movement relative to the path of movement of the moving length,
said means for reciprocating said cut-off assemblies comprising a rotating elongated crank having an adjustable length and a pivot point and means for adjusting the length of the crank while the machine is operating to vary the length of the crank and therefore the distance of reciprocating of the tube cut-off assemblies, said means for adjusting the length of said crank comprising first drive means for rotating said crank and second drive means for changing the effective length of said crank,
means for changing the relative positions of said first drive means and second drive means,
said means for interconnecting said motor and said cut-off assemblies comprising a crank arm pivotally connecting said crank and said shaft supporting said cut-off assemblies,
a housing supported for transverse movement relative to the direction of movement of said length of material in said machine,
said pivot point of said crank to said crank arm being substantially aligned with the axis of the shaft in which said cut-off assemblies are mounted when the crank is substantially perpendicular to said shaft, and
differential means in said housing between said motor and said crank for changing the effective length of said crank while the motor is operating by moving said housing transversely relative to the direction of movement of said length of material in said machine, while maintaining said pivot in alignment with the axis of said shaft.

30. The cut-off machine set forth in claim 29 including means for sensing the position of the tube cut-off assemblies, means for sensing the speed of the tubing,
means for sensing the speed of the motor,
means for sensing the position of the housing,
microprocessor means responsive to each of said sensing means and operable to maintain the speed of the motor in synchronism with the speed of the moving workpiece, maintain the length of the crank for reciprocating a predetermined distance and synchronizing the operation of the knife of the cut-off assemblies.

31. A cut-off machine adapted to be positioned downstream from a roll forming mill for receiving moving length of material from a source and severing a length from the moving length, said machine comprising a cut-off assembly which is reciprocated longitudinally of the moving length and has a non-rotating knife blade having a cutting edge operated during the movement toward the machine to sever a length,
means for supporting said cut-off assembly for reciprocating movement,
means for reciprocating said cut-off assembly in synchronism with the speed of the moving length to the machine,
a motor,
means interconnecting said motor and said means for reciprocating said cut-off assembly,
means interconnecting said motor and said means for moving said knife blade,
said means for reciprocating said cut-off assembly comprising a shaft supporting said cut-off assembly and mounted for reciprocating movement relative to the path of movement of the moving lengths
said means for reciprocating said cut-off assembly comprising a rotating crank having an adjustable length and means for adjusting the length of the crank while the machine is operating to vary the length of the crank and therefore the distance of reciprocating of the cut-off assembly, said means for adjusting the length of said crank comprising first drive means for rotating said crank and second drive means for changing the length of the crank, said first and second means being adjustable relative to one another, means for changing the relative position of said first drive means and second drive means, said cut-off assembly including means for guiding said knife blade in an endless path, supporting means for supporting said tubing adjacent the cut-off assembly, and said endless path having a portion adjacent said supporting means which moves the knife blade in a straight line such that said cutting edge of said knife blade moves in a straight line transversely of its cutting edge with respect to said tubing at said support means to cut a length from said moving length of tubing in a single stroke.

32. A cut-off machine adapted to be positioned downstream from a source mill for receiving a moving length and severing plural lengths from the moving length, said machine comprising a plurality of cut-off assemblies positioned in longitudinally spaced relation at a predetermined distance which are reciprocated longitudinally of the moving length, each cut-off assembly including a non-rotating knife blade having a cutting edge which is operated during the movement away from the mill to sever plural lengths, means for supporting said cut-off assemblies for reciprocating movement, means for reciprocating said cut-off assemblies in synchronism with the speed of moving lengths toward the machine, a motor, means interconnecting said motor and said means for reciprocating said cut-off assemblies, means interconnecting said motor and said means for moving said knife blade, said means for reciprocating said cut-off assemblies comprising a shaft supporting said cut-off assemblies and mounted for reciprocating movement relative to the path of movement of the moving length, said means for reciprocating said cut-off assemblies comprising a rotating crank which has an adjustable length, means for adjusting the length of the crank while the machine is operating to vary the length of the crank and therefore the distance of reciprocating of the cut-off assemblies, said means for adjusting the length of said crank comprising first drive means for rotating said crank and second drive means for changing the length of said crank, means for changing the relative positions of said first and second drive means, said cut-off assembly including means for guiding said knife blade in an endless path, supporting means for supporting said tubing adjacent the cut-off assembly, and said endless path having a portion adjacent said supporting means which moves the knife blade in a straight line such that said cutting edge of said knife blade moves in a straight line transversely of its cutting edge with respect to said tubing at said support means to cut a length from said moving length of tubing in a single stroke.

* * * * *